Jan. 13, 1970   L. D. CADOGAN   3,489,390
VACUUM CONTROL
Filed Feb. 6, 1967
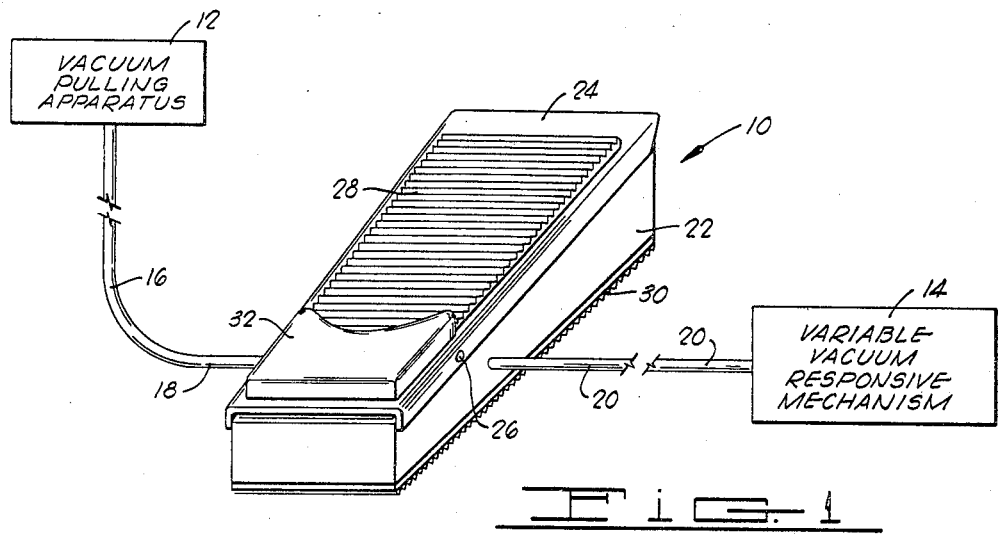
Fig. 1
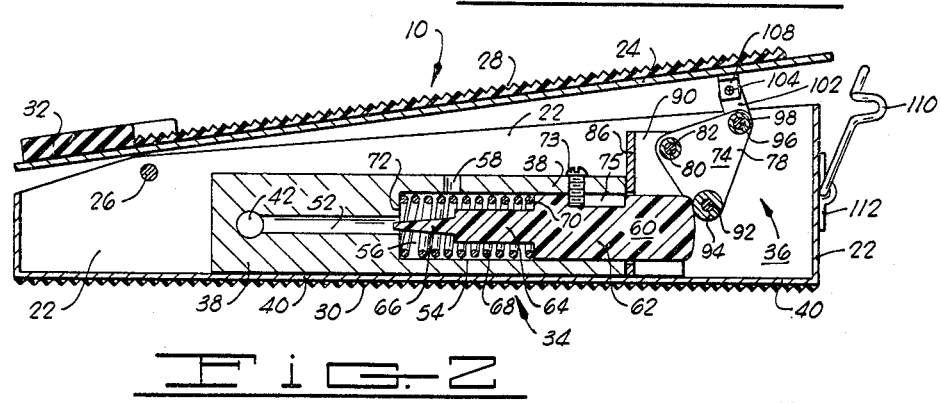
Fig. 2
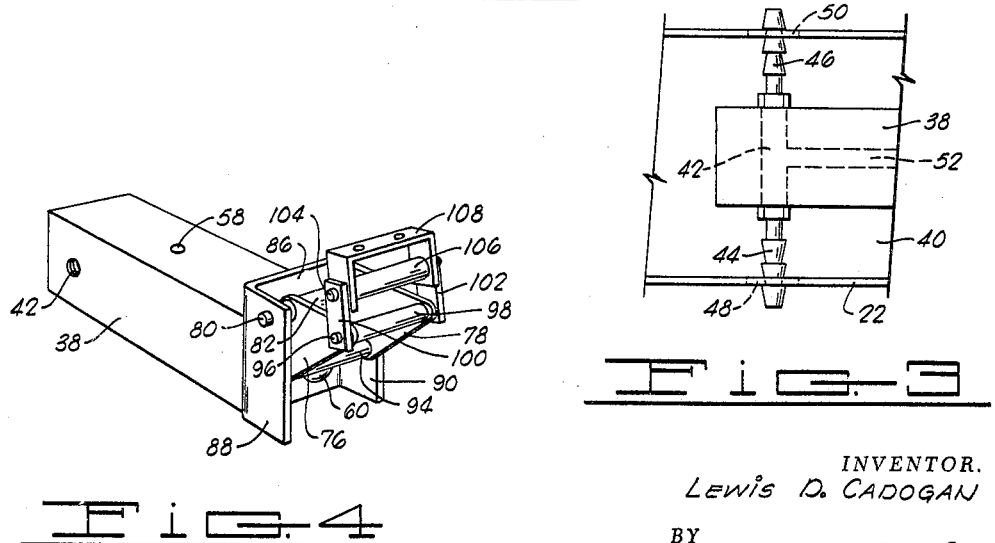
Fig. 3
Fig. 4
INVENTOR.
Lewis D. CADOGAN
BY
ATTORNEYS

United States Patent Office 3,489,390
Patented Jan. 13, 1970

3,489,390
VACUUM CONTROL
Lewis D. Cadogan, 2717 Manchester,
Village, Okla. 73120
Filed Feb. 6, 1967, Ser. No. 619,501
Int. Cl. F16k *31/00, 31/44*
U.S. Cl. 251—295        7 Claims

ABSTRACT OF THE DISCLOSURE

A foot operated vacuum control valve having a first chamber which is insertable in serial connection in the fluid flow or evacuation circuit and having a second, T-connected vent chamber with an associated plunger which can be opened and closed under the control of a foot pedal to vary the amount of fluid flow which is drawn through the first chamber.

BACKGROUND OF THE INVENTION

Field of invention

This invention relates generally to improvements in fluid valving and control apparatus and, more particularly, but not by way of limitation, to an improved vacuum control valve apparatus which can be regulated by foot operation to permit varied degrees of suction.

SUMMARY OF THE INVENTION

The present invention contemplates a lever arrangement which can be foot operated through a series of angular positions to effect proportionally varying degrees of closure of a fluid control valve. In its more limited aspects, the invention contemplates a treadle assembly consisting of a base member and a pedal member wherein a fluid control valve body defining a fluid passage chamber and a vent chamber is mounted within said treadle assembly on said base assembly. A valve plunger is positioned within the vent chamber to be moved in varying degrees as controlled by movement of the pedal member thereby to effect control of fluid flow or suction through the valve by venting the main fluid passage through the valve body.

Therefore, it is an object of the present invention to provide a foot-controlled air valve which can effect varying degrees of closure such that more versatile control of fluid flow is effected.

It is also an object of the present invention to provide a foot-controlled valve which can be used with pneumatically driven manual equipment such that a high degree of control can be exercised by the operator's foot while both hands remain free for other primary manipulations.

Finally, it is an object of the present invention to provide a foot-operated vacuum control valve which is extremely sturdy and capable of relatively trouble-free operation while requiring minimum maintenance and cleaning precautions.

Other objects and advantages of the invention will be evident from the following detailed description when read in conjunction with the accompanying drawings which illustrate the invention.

BRIEF DESCRIPTION OF DRAWINGS

FIG. 1 is a pictorial block diagram showing the foot-controlled valve in operative interconnection;

FIG. 2 is a side view of the foot-controlled valve in central vertical section;

FIG. 3 is a top view of a portion of the foot-controlled valve to illustrate certain aspects of the valve body; and FIG. 4 is a perspective view of a portion of the foot-controlled valve which better illustrates the detailed construction of the linkage assembly.

DESCRIPTION OF THE PREFERRED EMBODIMENT

FIG. 1 shows a foot-controlled valve 10 as it might be connected for a typical fluid control operation. The valve 10 is connected to control the drive force or suction between a vacuum pulling apparatus 12 and a variable vacuum responsive mechanism 14 by inclusion in the air-tight fluid line 16. That is, the foot-controlled valve 10 is merely connected in series between the two halves 18 and 20 of control line 16. The variable vacuum responsive mechanism 14 may be any of various types of vacuum apparatus, particularly equipment which is common to the dental and surgical fields, e.g., equipment adapted for inner ear surgery, etc. The vacuum pulling apparatus 12 may be one of the many conventional types of such power sources.

The foot controlled valve 10 consists of a base member 22 having a lever or pedal member 24 affixed for movement thereon, i.e., pivotal movement about the connection provided by a pin member 26. Suitable gripping or bracing surfaces of treaded rubber or such may be bonded to the valve 10 to form the pedal tread 28 and/or a floor gripping member 30. Also, a heel retainer block 32 may be suitably affixed on the rearward portion of pedal member 24. The vacuum hoses 18 and 20 are then led through holes (to be further described) in the sides of base member 22 for sealing affixure to a valve body located within the base member 22 as will be further described.

Referring now to FIG. 2, the interior of the foot-controlled valve 10 houses a vent valve 34 and an associated linkage or actuating assembly 36. The vent valve 34 has a valve body 38 which is formed as a rectangular block or the like and is rigidly affixed to the bottom plate 40 of base member 22. The valve body 38 is formed to have a first chamber or lateral bore 42 therethrough which provides the main flow passage or circuit interconnection for the vacuum line. Thus, as shown in FIG. 3, suitable tubing connectors 44 and 46 can be threaded or otherwise secured within the opposite ends of the bore 42 and in-line with respective holes 48 and 50 through opposite side walls of the base member 22. The vacuum tubes 18 and 20 (FIG. 1) can then be attached to the opposite tubing connectors 44 and 46 (shown with scalloped inserts) by using sealing cement or whatever, the direction of flow through first chamber 42 being immaterial to proper operation of the foot-controlled valve 10.

The valve body 38 is formed with an additional, T-connected vent bore 52 which is placed perpendicular to lateral bore 42 and generally in the center of valve body 38. The vent bore 52 is then enlarged to a counterbored portion 54 which defines the vent chamber 56 in communication with the exterior by means of a suitably placed aperture 58.

The vent valve 34 further consists of a valve plunger 60 having the same cross-sectional configuration as the vent chamber 56 of valve body 38 and being slidably received therein. The valve plunger 60 is formed such that the first portion or the sealing and aligning portion 62 has a cross-sectional configuration which mates with counterbore 56; and then a mid-portion 64 is formed with a reduced cross-section configuration, i.e., reduced diameter, diagonal or whatever other symmetrical measurement; and the valve plunger 60 is finally terminated by a linearly tapered portion 66 which is still reduced in size from mid-portion 64, the taper ranging from the size of vent bore 52 to the final terminating size which is considerably smaller than bore 52. A compression spring 68 is retained within vent chamber 56 as aligned by plunger mid-portion 64 and compressed between the shoulder portion 70 of plunger 60 and the end wall or shoulder 72 of vent chamber 56. A retaining screw 73 is secured through valve body 38 into a slide way 75 which is formed in plunger 60.

The linkage or actuating assembly 36 consists primarily of a tri-link 74 which can be actuated in response to movement of the foot pedal 24 to impart horizontal movement to the plunger 60 to thereby control the flow of venting air which may pass through aperture 58 and vent chamber 56 around the tapered plunger projection 66 into the vent bore 52. The tri-link 74 (see also FIG. 4) is formed by a pair of triangular side members 76 and 78 which are secured in parallel arrangement as will become apparent. The triangular side members 76 and 78 are each rotationally or pivotally supported about a pin 80 separated by a spacer spool 82, pin 80 being secured in a bracket 86. The bracket 86 is an upright U-shaped member having a base portion secured to the end of valve body 38 and extending tines 88 and 90 for connection with the pin 80. Conventional retaining fasteners may be employed for securing the various pins and rotating connections of actuating assembly 36.

The lower corner of tri-link 74, triangular pieces 76 and 78, are connected by a pin member 92 which carries a roller 94, roller 94 being maintained in contact with the end of plunger 60 to provide a pushing surface. A remaining or upper corner of tri-link 74 is pivotally engaged for movement with the pedal member 24. A pin 96 and spacing roller 98 pivotally secure the triangular side members 76 and 78 to respective straps or links 100 and 102; in similar manner, the upper ends of links 100 and 102 are pivotally connected by a pin 104 and spacing spool 106 to the tines or side members of the U-shaped bracket member 108. The base portion of U-shaped bracket member 108 is suitably secured to the under side of pedal member 24 to complete the linkage between the pedal member 24 and the horizontally movable plunger 60.

A spring clip 110 or such may be pivotally connected as by a suitably secured overlay 112 to the end wall of base member 22 for the purpose of providing a locking member which may be desirable in certain applications. That is, pedal member 24 can be totally depressed, the full vacuum or wide-open control position, and the spring clip 110 can be secured thereover to hold it in this position until it is manually released. It should be understood that any of a wide variety of materials may be used in the construction of the invention; however, from the standpoint of providing trouble free operation over a long period, it is desirable that the valve units be constructed primarily of stainless steel or other highly durable metals with selected plastics such as Nylon or Teflon being used to form the valve plunger 60 and particular mating or sealing surfaces thereabout.

OPERATION

The foot-controlled valve 10 enables variable control of fluid flow, particularly the regulation of suction over a wide range of adjustment. Control may be from zero suction with the foot-controlled valve 10 in the normal position to full suction or vacuum force when the pedal member 24 is fully depressed beneath the operator's foot.

The foot-controlled valve 10, as shown in FIG. 2, is in its fully "off" position wherein no pedal pressure is exerted, and compression spring 68 extends plunger 60 rearward to force tri-link 74 upward to hold foot pedal 24 at its uppermost position. The taper projection 66 of valve plunger 60 is at its most rearward position and withdrawn from the bore 52 such that maximum air flow or venting action takes place through orifice 58, vent chamber 56, and bore 52 into the lateral bore 42, the main vacuum flow. Thus, referring also to FIG. 1, when pedal 24 is uppermost, fluid flow is primarily through the venting assembly of vent chamber 56 and orifice 58 and then through vacuum hose 18 to the vacuum pulling apparatus 12, and effectively no vacuum is pulled through the vacuum hose 20 leading to the variable vacuum responsive mechanism 14 to cause operation or function thereof. The vent air passage through bore 52, vent chamber 56 and orifice 58 need only allow sufficient freedom of air flow such that no further vacuum is apparent through vacuum hose 20 to the variable vacuum responsive mechanism 14.

As increasing drive or vacuum is desired at the variable vacuum responsive mechanism 14, the foot pedal 24 can be depressed to close off the venting action by a certain desired amount, an equal vacuum force being transferred to or becoming apparent at said variable vacuum responsive mechanism 14. That is, with vacuum pulling apparatus 12 causing a constant amount of vacuum force, a restriction or lessening of the venting air flow by insertion of plunger 60 and tapered end portion 66 within the bore 52 will result in a corresponding increase in vacuum force which must be pulled from the only remaining path, i.e., the vacuum hose 20 from variable vacuum responsive mechanism 14. Thus, the vent valve 34 as controlled by the actuating assembly 36 and foot pedal 24 is a proportioning mechanism which varies the amount of suction as between variable vacuum responsive mechanism 14 and the exterior or system surrounds.

The taper of plunger projection 66 is such that a linear control over a wide range can be exercised with absolute sealing or complete cutoff being provided upon sufficient insertion of plunger projection 66 with end bore 52. This, of course, would represent the maximum position or that position of foot-controlled valve 10 wherein maximum suction force is realized at the variable vacuum responsive mechanism 14. As previously stated, a spring clip 110 is included to lock the foot pedal 24 down such that foot-controlled valve 10 is held in its fully "ON" position. There are certain applications where this is particularly desirable and, in the event that a condition requiring more varied or versatile vacuum control arises, it is only necessary to flip the spring clip 110 off to thereafter resume pedal control.

Pedal control of the power source may be particularly attractive for various reasons. For example, vacuum control finds particular application in various forms of tedious surgery wherein vacuum operated instruments are employed. Thus, the operation of the individual instruments can be foot-controlled while the operator or surgeon's hands remain free for instrument manipulation and other simultaneous acts and/or adjustments.

The foregoing invention discloses a novel vacuum control valve which finds particular utility in the surgical field. It should be understood that conventional practices as to fastener techniques, materials joining, bonding, etc., are a matter of choice depending upon the exigencies of the situation. While certain materials have been previously stated as being preferable, this should by no means be controlling since there are many materials exhibiting varied attributes which are suitable for use in constructing the present valve and pedal control assembly.

Changes may be made in the combination and arrangement of parts or elements as heretofore set forth in the specification and shown in the drawings; it being understood that changes may be made in the embodiment disclosed without departing from the spirit and scope of the invention as defined in the following claims.

What is claimed is:

1. A treadle actuated control valve providing continuous pressure adjustment, comprising:
   a base member;
   a pedal member having first and second ends with said first end being pivotally affixed to the base member;
   valve body means connected to said base member, said valve body means having a longitudinal bore extending therethrough with said longitudinal bore having a vent chamber and a venting bore, said valve body means also having a lateral bore having an inlet port and an outlet port and communicating at a central point with said venting bore, said lateral bore being extended perpendicular to said venting bore, and said vent chamber being formed as a counterbore to the venting bore;

plunger means insertable within said vent chamber to adjust the degree of closure of said venting bore, said plunger means having a first portion of similar cross-sectional configuration as said vent chamber to be slidably received within said vent chamber, a second portion having a cross-sectional configuration of less area extending axially from the first portion, and a third portion extending axially from the second portion and being further reduced in area of cross-sectional configuration and being tapered for insertion within said venting bore to effect varying degrees of closure of said venting bore; and linkage means which is pivotally connected to the second end of said pedal member and pivotally affixed to said valve body means to bear on said plunger means such that the amount of horizontal insertion of the tapered third portion of plunger means within the venting bore varies as the vertical displacement of the pedal member second end relative to the base member.

2. Apparatus as set forth in claim 1 which is further characterized to include:

spring means disposed within said vent chamber in contact with said plunger means to continually bias said plunger means toward its more removed position which also urges said pedal member to a normal position.

3. Apparatus as set forth in claim 1 wherein naid linkage means comprises:

triangular-shaped means having one corner pivotally supported above said plunger means and a second corner resting in movable contact with said plunger means; and strap means pivotally connected between said pedal member and a third corner of said triangular-shaped means such that depression of said pedal member is transmitted through said pivoting triangular-shaped means as a lengthwise movement to said plunger means.

4. Apparatus as set forth in claim 1 which is further characterized to include:

spring means disposed within said vent chamber and in contact with said first portion of plunger means and surrounding said second portion to continually urge said plunger means away from said venting bore portion and tending to urge said pedal member to a normal position.

5. A treadle actuated control valve for continuous pressure adjustment between a vacuum source and a supply point comprising:

a base member;

a pedal member having first and second ends with the first end being pivotally affixed to the base member;

valve body means connected to said member, said valve body means having a first lateral chamber therethrough which terminates in lateral ports on opposite sides of said valve body means, said lateral ports being connected between said vacuum source and supply point, said valve body means also having a vent bore formed perpendicular to and interconnected with said first lateral chamber, said vent bore having an enlarged counterbored outer vent chamber which includes a vent orifice leading out of said valve body means;

plunger means comprising a first tapered portion which is to be slidingly received within said vent bore and having a second enlarged outer portion having the approximate cross-sectional configuration of said counterbored vent chamber and to be slidably received therein while maintaining said first tapered portion of the plunger means within said vent bore to adjust the degree of closure of said vent bore;

spring means within said counterbored vent chamber urging outward against said plunger means second enlarged portion to continually urge said plunger means toward its more removed position to maintain said vent bore normally open; and linkage means connected to the second end of said pedal member and being movable to bear upon said plunger means such that the amount of longitudinal insertion of said plunger means varies as the downward displacement of the pedal member relative to the base member.

6. Apparatus as set forth in claim 5 wherein said linkage means comprises:

triangular-shaped link means having one corner pivotally supported above said plunger means and a second corner resting in movable contact with said plunger means; and strap means pivotally connected between said pedal member and a third corner of said triangular-shaped link means such that depression of said pedal member is transmitted through said pivoting link means as a horizontal movement to said plunger means.

7. Apparatus as set forth in claim 5 wherein said plunger means is characterized in that:

said first tapered portion of plunger means is further formed as a mid-portion and an axially aligned conical portion, said mid-portion being formed to have a cross-sectional configuration larger than said vent bore and smaller than said enlarged second outer portion to be received within said spring means, and said tapered portion being formed as a linearly tapered conical shape for insertion within said vent bore to effect varying degrees of closure depending upon the horizontal position of said plunger means.

References Cited

UNITED STATES PATENTS

| 1,980,752 | 11/1934 | Eskilson et al. | 251—322 |
| 2,141,070 | 12/1938 | Newell | 251—295 X |
| 3,250,006 | 5/1966 | Wilson | 251—295 X |

FOREIGN PATENTS

| 1,173,752 | 7/1964 | Germany. |

WALTER A. SCHEEL, Primary Examiner

L. G. MACHLIN, Assistant Examiner

U.S. Cl. X.R.

251—205, 240